April 2, 1968 V. J. DAVID 3,376,442
ALTERNATING CURRENT ELECTRIC MOTOR
Filed Jan. 18, 1965 2 Sheets-Sheet 1

INVENTOR.
VERNON J. DAVID
BY
Widdowson and Stoffel
ATTORNEYS

April 2, 1968 V. J. DAVID 3,376,442
ALTERNATING CURRENT ELECTRIC MOTOR
Filed Jan. 18, 1965 2 Sheets-Sheet 2

INVENTOR.
VERNON J. DAVID
BY
Widdowson and Steffel
ATTORNEYS

United States Patent Office 3,376,442
Patented Apr. 2, 1968

3,376,442
ALTERNATING CURRENT ELECTRIC MOTOR
Vernon J. David, Durham, Kans. 67438
Filed Jan. 18, 1965, Ser. No. 426,155
12 Claims. (Cl. 310—156)

ABSTRACT OF THE DISCLOSURE

This invention relates to electric motors, and more particularly to electric motors having permanent magnet rotors of new materials, new designs, and new relationships with the stators. More particularly, this invention relates to new and novel electric motors having alternating current stators and permanent magnet type rotors each rotatable about an axis spaced above and inclined relative to the respective stator with the only requirement being that the rotor is placed within the magnetic field generated by the stator. More specifically, this invention relates to an electric motor using a permanent magnet having a minimum separation between poles and constructed of a metal ferrite such as barium ferrite, magnesium ferrite, or combinations thereof to provide a self-starting electric motor powered by a magnetic field with the axis of magnetic rotation and position thereof merely limited, first, by the strength of the magnetic field and, secondly, the axis of rotation cannot be aligned with the upright axis of the poles of the stator.

---

There are many types of permanent magnet rotor type motors known to the art. The known permanent magnet rotor type electric machines, particularly alternating current motors, are relatively expensive and do not permit the rotor to assume different positions relative to the stator. Further, many of the motors utilize permanent magnets which lose their magnetism over a period of time thus reducing the power and efficiency of the motors.

I have invented a new alternating current electric motor. The alternating current electric motor of my invention has a stator, including a coil with terminals therefor which are connectible to a source of alternating current. A rotor is provided which is positioned in the magnetic field generated by the stator. The rotor is an element with side surfaces, a major dimension, and a minor dimension. The element of the rotor is composed of a metal material, preferably a metal ferrite, and is constructed with dissimilar magnetic poles on opposite sides spaced across the minimum dimension. A means is provided to rotatably support the element on an axis generally parallel to the major dimension.

A preferred specific embodiment of my alternating current electric motor is a synchronous motor, in which the axis of rotation of the rotor is positioned transverse to the lines of force generated by the stator.

The new electric motor of my invention solves many of the problems prevalent to alternating electric current motors known to the prior art. The electric motor of my invention with a permanent magnet rotor is relatively inexpensive to produce and maintain in operation. The rotor of the electric motor of my invention can be moved relative to the stator without materially interfering with its operation. In contrast, in electric motors known to the prior art the stator and rotor must assume a fixed relative relationship. This feature of my invention is accomplished by providing a large area magnetic field to supply the forct necessary to rotate the rotor. Another important advantage of my alternating current electric motor is that the material used in the rotor does not lose its magnetism. The motor of my invention will operate over long periods of time without losing power or efficiency. Still further the permanent magnets used in the rotor of my invention are of light weight ceramic type material which is very light in weight. Another important difference between the electric motor of my invention and electric motors known to the prior art is that hysteresis losses are minimized in my motor since the conductors are eliminated or reduced to a minimum.

An object of this invention is to provide a new alternating current electric motor.

Another object of this invention is to provide an alternating current electric motor that is inexpensive to produce and to maintain in operation.

Yet another object of this invention is to provide a new alternating current electric motor having a spaced rotor that can be moved and shifted in position relative to the stator even during operation.

Another object of this invention is to provide a new alternating electric current motor having an improved permanent magnet type rotor that is light in weight.

Another object of this invention is to provide a new alternating current electric motor embodying new designs for rotors and new materials resulting in new magnetic circuit designs and principles.

Still another object of this invention is to provide a new synchronous alternating current electric motor with a rotor made of highly orientated metal ferrite material.

Other objects and advantages of the new electric motor of my invention will be apparent to those skilled in the art upon reading the disclosure.

Drawings accompany and are a part of this disclosure. These drawings depict preferred specific embodiments of the new electric motor of my invention and it is to be understood that such drawings are not to unduly limit the scope of my invention. In the drawings, FIG. 1 is a front elevational view of a preferred specific embodiment of the electric motor of my invention.

The following is a discussion and description of new alternating current electric motors of my invention made with reference to the drawings wherein the same reference numerals are used to indicate the same or similar parts and/or structure.

Figure 1:
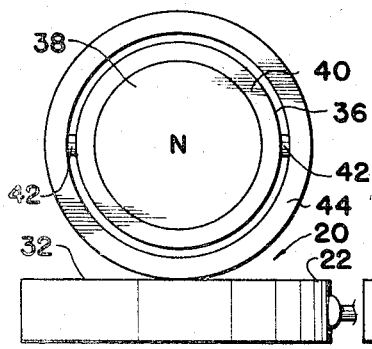
Figure 2:
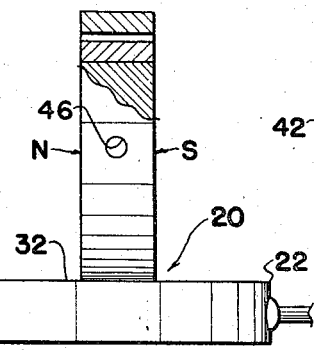
FIG. 2 is a side elevational view in partial cross section of the embodiment shown in FIG. 1.
Figure 3:
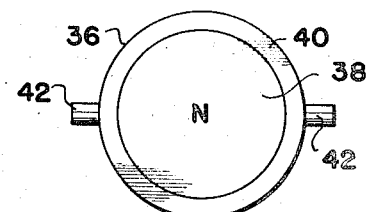
FIG. 3 is a front elevational view of the motor element of the embodiment shown in FIGS. 1 and 2.

The discussion and description is of preferred specific embodiments of the new electric motor of my invention, and it is to be understood that such is not to unduly limit the scope of my invention.

Referring now to the drawings FIGS. 1 through 12, and FIGS. 1 to 3 and 8 and 9 in particular, there is illustrated a preferred specific embodiment of a synchronous alternating current electric motor 20. The electric motor 20 has a stator 22, shown in cross section in FIG. 9. The stator 22 has an annular horizontally disposed coil 24 with terminals 26 connected to coil 24 and also connectible to a source of alternating current. Preferably, a cylindrically shaped soft iron core 28 is positioned in the center of coil 24. The coil 24 can be wound on a suitable spool 30 if desired. The core 28 can be made of any suitable ferro magnetic substance having a suitably high value of relative permeability. The ferro magnetic elements suitable for use in the core 28 are iron, nickel, cobalt and alloys including one or more of same.

The core 28 decreases the reluctance of the magnetic paths of the magnetic field generated by the coil 24 and prevents straying of the lines of magnetic flux making possible a more powerful motor. Preferably a flat covering sheet 32 is provided on the top of stator 22 in overlying and enclosing relationship to the core 28 and coil 24. If desired the entire stator 22 can be enclosed in a case preferably of the same type of non-magnetic material. Preferably the covering sheet 32 is of non-magnetic material, as for example, fiber board, plastic, etc.

A rotor 36 is provided which is positioned generally above the core 28 of stator 22. The relative position of the rotor 36 is clearly shown in FIGS. 1 and 2 of the drawings. The rotor 36 has a relatively thin flat disc-shaped permanent magnet 38 having dissimilar poles on opposite sides thereof in the positions indicated by N and S. The permanent magnet 38 can be made of any suitable type of material, more preferably a metal ferrite such as barium ferrite, magnesium ferrite, or mixtures thereof. Most desirably the permanent magnet 38 is formed of highly orientated barium ferrite. In practice the metal ferrite material can be pressed under high pressure to the desired shape, and subsequently sintered in a high temperature furnace and then magnetized. The metal ferrite can also be produced by adhering the separate crystals with a suitable binder. Still another preferred specific embodiment suitable for use in the electric motor of my invention is a ferrite ceramic having the chemical formula of

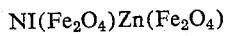

$$NI(Fe_2O_4)Zn(Fe_2O_4)$$

Since the permanent magnet formed of a metal ferrite or other similar material is normally quite fragile, an annular reinforcing ring 40 is provided, which is disposed about the permanent magnet 38. A radially extending shaft, preferably of non-magnetic material, is affixed to the rotor 36. The shaft has radially extending portions 42 protruding diametrically from the reinforcing ring 40. An annular support ring 44 provided with diametrically disposed apertures 46 for receiving the extending shaft portions 42 is mounted on stator 22 as shown more clearly in FIGS. 1 and 2. Any other suitable means can be used to rotatably support the rotor. In certain applications it may be desirable to support the rotor by flotation on a liquid. The structure thus described and illustrated is a new synchronous alternating current electric motor in which the axis of rotation of the rotor 36 is positioned generally transverse to the magnetic lines of force of the field generated by the stator. The combination rotor and support 44 can be moved about the top of stator 22 and/or removed a short distance therefrom.

Figure 4:
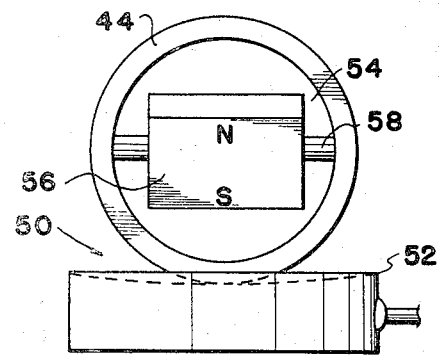
FIG. 4 is a front elevational view of another preferred specific embodiment of my electric motor.
Figure 5:
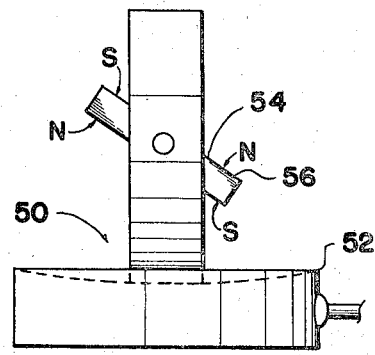
FIG. 5 is a side elevational view of the embodiment of my invention shown in FIG. 4.

In FIGS. 4 and 5 is illustrated another preferred specific embodiment of a synchronous alternating current electric motor 50. The electric motor 50 has a stator 52 quite similar to stator 22 explained in detail in connection with electric motor embodiment 20 of the invention. The stator 52 has a coil and core, arranged in the same general manner as described in stator 22. However, stator 52 differs from stator 22 in that the top surface thereof is provided with a concave shape, as indicated by dotted lines in FIGS. 4 and 5. The rotor 54 is positioned generally above the stator 52 and rotates about a generally horizontal axis of rotation. The rotor 54 has a relatively thin, flat, generally square shaped permanent magnet 56, preferably a metal ferrite material of the same general type described previously. The permanent magnet 54 has magnetized therein two sets of magnetic poles positioned as indicated on the drawings as N and S. Note that the sets of magnetic poles are disposed in spaced relation to the axis of rotation of the rotor. A shaft 58, preferably a non-magnetic material, is provided having portions extending outwardly from permanent magnet 56. A support ring 44 having diametrically disposed apertures, rotatably supports rotor 56 on stator 52. The rotor and support ring 54 can be moved freely about the top surface of the stator 52 while the rotor is rotating. The motor 50 is of the synchronous type having a normal speed of 1800 r.p.m. when 60 cycle AC current is used to drive the motor. This motor, as well, as the motor 20 previously described, is normally not self starting with 60 cycle AC current. The motors are normally started by flipping the rotor with a finger in the desired direction of rotation, or some other suitable rotating procedure or device utilized. The rotors must be spun to very nearly the desired rotational speed. The rotor will rotate in either direction.

Figure 6:
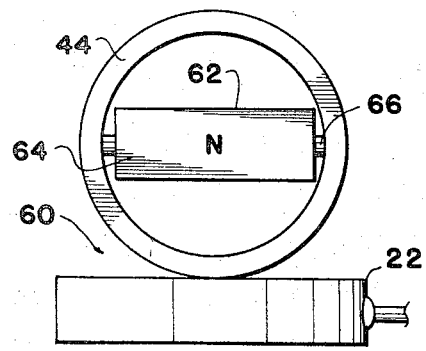
FIG. 6 is still another preferred specific embodiment of a self-starting electric motor of my invention.
Figure 7:
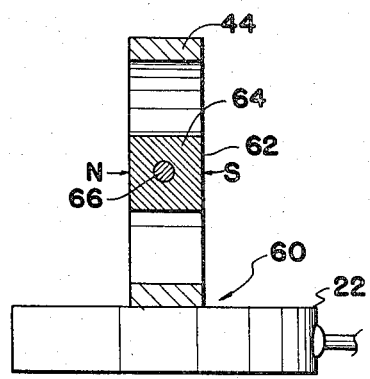
FIG. 7 is a side elevational view in partial cross section of the embodiment shown in FIG. 6.
Figure 8:
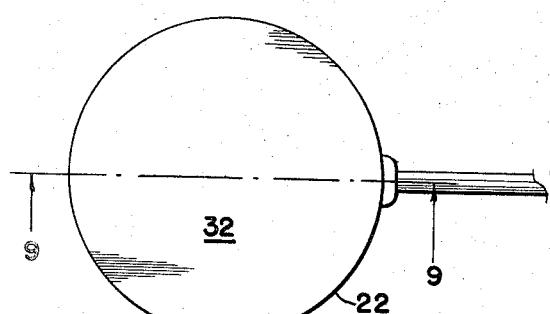
FIG. 8 is a top plan view of a preferred embodiment of the stator element of the electric motor of my invention
Figure 9:
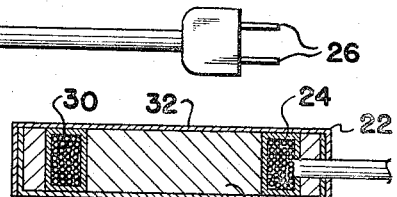
FIG. 9 is a cross sectional view taken on line 9—9 of FIG. 8.

In FIGS. 6 and 7 is illustrated still another preferred specific embodiment of an alternating synchronous current electric motor 60. Motor 60 has a rotor of a different design in that the distance between the poles is held to a minimum which enables it to be self starting. The electric motor 60 is provided with a stator 22 of the same general construction as explained in the same detail with respect to the electric motor embodiment 20. A rotor 62 is mounted above stator 22 with the axis of rotation positioned generally transverse to the magnetic lines of force produced by the stator. The rotor 62 has an elongated permanent magnet 64 having generally square transverse cross sectional configuration. The permanent magnet is formed of a metal ferrite material of the same type discussed previously. The rotor 62 has a pair of magnetic poles in the positions as indicated on the drawings by N and S. A shaft 66 is mounted on the permanent magnet 64 and extends along the longitudinal axis by having a short distance between poles, a minimum amount of rotational movement is necessary before the opposite pole is attracted by the reversing AC current to flip the rotor 62 and bring the same up to synchronous speed. If necessary or desirable the cross sectional configuration of the permanent magnet 64 can be modified, as for example by providing a circular cross sectional configuration; however, it is important that the proper shape rotor magnetic field be formed and weight kept to a minimum. A support ring 44 having diametrically disposed apertures receiving the ends of shaft 66 is used to support the rotor 62 in the desired position above stator 22. As mentioned previously the electric motor embodiment 60 is a self-starting synchronous speed motor having a normal rotational velocity of 3600 r.p.m.'s. When the current is applied to the stator 22 it will be noted that the rotor 62 will vibrate slightly and then begin rotating and sustained vibration, in an arc of less than 180 degrees, may be utilized in variations of this motor for specialized uses. Rotation can be in either direction. This electric motor is self-starting because the moment of inertia of rotor 62 is sufficiently small so that a sufficiently large starting torque is exerted during a half cycle of current to flip the rotor 62 and the same is picked up by the reversing field of the stator 22 to bring the rotor 62 up to synchronous speed. It is noted that the rotor 62 need only be contained within the magnetic paths of the stator 22 to maintain rotation and the axis of the shaft 66 may be inclined to any position except in alignment with the axis of the magnetic poles of the stator 22 which, in this position, equalizes the forces and stops rotation thereof.

Figure 10:
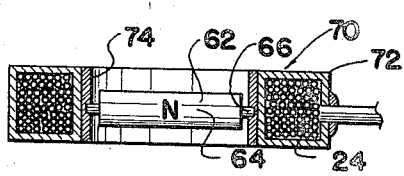
FIG. 10 is a view in cross section of still another preferred specific embodiment of an electric motor of my invention.
Figure 11:
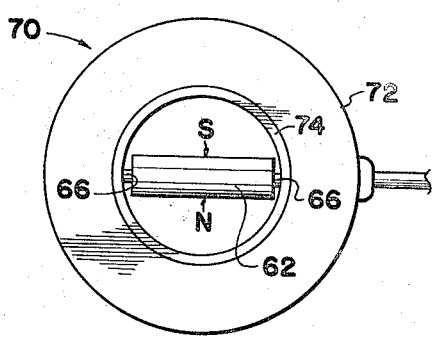
FIG. 11 is a top plan view of the embodiment shown in FIG. 10.

In FIGS. 10 and 11 is shown an embodiment of a self-starting synchronous electric motor 70 that is generally similar in operation to embodiment 60 in having the distance between the poles held to a minimum resulting in self-starting. The rotor 62 is similar to the rotor in motor 60. Electric motor 70 of my invention has a stator 72 having an annular coil 24 with a cylindrically shaped ring 74 disposed therein. The ring 74 has diametrically opposed apertures which receive the ends of shaft 66 to thus support rotor 62 for rotation on an axis of rotation substantially perpendicular to the axis of the magnetic poles of the stator 72. This embodiment of my electric motor 70 is also self starting and employs a rotor having a relatively small moment of inertia similar to the rotor described in electric motor 60.

Figure 12:
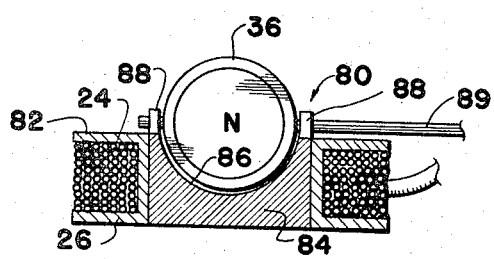
FIG. 12 is a view in cross section illustrating still another preferred specific embodiment of a synchronous alternating curernt electric motor of my invention.

In FIG. 12 is shown still another preferred specific embodiment of a synchronous electric motor 80 of my invention. The electric motor 80 has a stator 82 which includes a coil 24, and a spool 26 for supporting coil 24. A core 84 of ferromagnetic material is mounted in the center of coil 24. The core 84 has a top surface 86 which is concave in shape. A rotor 36 is provided which is generally similar to the rotor shown in electric motor embodiment 20. Two spaced bearing members 88 are mounted on the top edge portions of core 84 which receive shaft 89 to thereby support rotor 36 in the desired position. As can be seen, electric motor 80 is relatively simple and inexpensive to construct and it takes up a very small space. Since the moment of inertia of rotor 36 is relatively large, some means must be provided to rotate to near synchronous speed if the stator is not constructed to produce sufficient magnetic strength or if excessively high frequency current is used.

It can be seen that the various motor embodiments of alternating current motors of my invention can be used for a wide variety of purposes. In addition to the usual and normal function of a motor for imparting a torque to a drive shaft or the like, the motors of my invention are particularly adapted when properly modified to drive various elements whose positions vary, which must be free to be frequently removed, and which preclude an electrical connection between the rotor and source of current. Typical examples of such possible applications are liquid pumps for very corrosive and/or radioactive liquids where shaft seals are impractical, aerating goldfish bowls and bait storage tanks, mixing apparatus for food products where the mixing element is desirably removable for washing, etc. and many other applications where an electrical connection between the stator and rotor and source of power and rotor would be inconvenient or detrimental. The electric motor of my invention could also be used in toys, novelties, and the like.

As will be obvious to those skilled in the art, various changes and modifications of the preferred electric motor embodiments as disclosed herein can be made or followed without departing from the spirit of the disclosure or from the scope of the claims.

I claim:

1. A synchronous alternating current motor comprising, a stator having an annular horizontally disposed coil, terminals on said coil connectible to a source of alternating current, a cylindrically shaped soft iron core positioned in the center of said annular coil, a flat covering sheet of non-magnetic material positioned on the top of said coil and core in overlying and enclosing relation, a rotor positioned generally above and within the magnetic field created by said coil and said core and rotatable about a generally horizontally extending axis comprising, a flat disc-shaped permanent magnet of sintered barium ferrite having dissimilar poles on opposite sides thereof, an annular reinforcing ring disposed about said magnet, a radially extending shaft of non-magnetic material having portions protruding diametrically from said reinforcing ring on said magnet, an annular support ring disposed on said sheet and having diametrically disposed apertures receiving said portions of said shaft to thereby rotatably mount said rotor above said stator, said magnet positionable so as to extend laterally of said support ring to provide means for manually rotating said magnet to synchronous speed so as to be powered by the magnetic field of said stator.

2. A synchronous alternating current motor comprising, a stator having an annular coil, terminals on said coil connectible to a source of alternating current, a core of ferromagnetic material positioned in said annular coil, a rotor positioned generally above said stator within the magnetic field created by said stator in any position except in axial alignment with the magnetic poles of said stator comprising, a flat disc-shaped permanent magnet of a metal ferrite material composed of barium ferrite, magnesium ferrite, and combinations thereof, and having dissimilar magnetic poles on opposite sides thereof, a reinforcing ring disposed about said magnet, a shaft having portions protruding diametrically from said magnet, a support disposed above said stator having spaced apertures receiving said portions of said shaft to thereby rotatably mount said rotor.

3. The structure of claim 2 wherein the top surface of said core is concave in shape, and said support is comprised of two spaced bearing members affixed to the top edge portions of said core.

4. A synchronous alternating current motor comprising, a stator having an annular horizontally disposed coil, terminals on said coil connectible to a source of alternating current, a cylindrically shaped iron core positioned in the center of said coil, a covering element having a concave top surface disposed on the top of said coil and core in overlying relationship, a rotor positioned generally above and within the magnetic field created by said core and rotatable about a generally horizontal axis in any position except in axial alignment with the magnetic poles of said stator comprising, a thin flat and square shaped permanent magnet of sintered barium ferrite material having a north pole adjacent a first edge portion on a first surface, and a south pole directly opposite on a second surface, and a south pole on said first surface adjacent a second opposite edge portion, and a north pole opposite said last-mentioned south pole on said second surface, a shaft of non-magnetic material on said permanent magnet having extending portions, a support ring disposed on said covering element having diametrically disposed apertures receiving said extending portions of said shaft to thereby rotatably mount said rotor above said stator, and said magnet having portions positionable to extend laterally of said ring usable to manually rotate said magnet to synchronous speed.

5. A synchronous alternating current motor comprising, a stator having a coil, terminals on said coil connectible to a source of alternating current, a core of ferromagnetic material positioned in the center of said coil, a rotor positioned generally above said core within the said magnetic field created by said stator in any position except in axial alignment with the magnetic poles of said stator comprising a generally rectangular shaped permanent magnet of metal ferrite material selected from the group consisting of barium ferrite, magnesium ferrite, and mixtures thereof, a shaft supporting said permanent magnet, said permanent magnet having a plurality of sets of pairs of magnetic poles spaced from said shaft with certain ones of said poles successively positioned within the said magnetic field created by said stator, a support having spaced apertures receiving said portions of said shaft to thereby rotatably mount said rotor above said stator.

6. A synchronous self-starting alternating current motor comprising, a stator having an annular coil, terminals on said coil connectible to a source of alternating current, a cylindrically shaped iron core positioned in the center of said annular coil, a flat covering sheet of non-magnetic material positioned on the top of said coil and core in overlying and enclosing relation, a rotor positioned generally above and within the magnetic field created by said core and rotatable about a generally horizontal axis comprising, an elongated permanent magnet having a generally square transverse cross sectional configuration of a metal ferrite material selected from a barium ferrite, magnesium ferrite and mixtures thereof, said permanent magnet having dissimilar poles on opposite sides, a shaft disposed along the longitudinal axis of said elongated magnet having portions protruding from the ends thereof, a support means positioned above said stator having spaced apertures receiving the end portions of said shaft to thereby rotatably mount said rotor above said stator.

7. A self-starting alternating current motor comprising, a stator having a coil, terminals on said coil connectible to a source of alternating current, a core of ferromagnetic material positioned in said coil, a rotor positioned generally above said core within the magnetic field created by said stator comprising, an elongated permanent magnet of metal ferrite material selected from the group consisting of barium ferrite, magnesium ferrite, and mixtures thereof, said magnet having a generally square transverse cross sectional configuration with dissimilar magnetic poles on opposite sides thereof, a shaft for said magnet along the longitudinal axis of same, a support means on said coil engaging said shaft to thereby rotatably mount said rotor on said stator, said magnet rotatable about said shaft in any inclined position relative said stator except in axial alignment with the axis of the magnetic poles of said stator.

8. A synchronous self-starting alternating current motor comprising, a stator having a coil, terminals on said coil connectible to a source of alternating current, a rotor comprising, an elongated permanent magnet of metal ferrite material selected from the group consisting of barium ferrite, magnesium ferrite, and mixtures thereof, dissimilar magnetic poles on opposite sides of said permanent magnet having a minimum separation therebetween, a shaft disposed on the longitudinally extending axis of said magnet, a support for said rotor disposed within said coil having spaced apertures for receiving said shaft to thereby rotatably mount said rotor within said coil of said stator on an axis of rotation perpendicular to the axis of the magnetic poles of said stator.

9. A synchronous alternating current electric motor comprising, a stator having a coil, terminals on said coil connectible to a source of alternating current, a rotor positioned in the magnetic field generated by said stator having an element with side surfaces, a major dimension and a minor dimension, said element composed of a metal material having dissimilar magnetic poles on opposite sides spaced across said minor dimension, and a means to rotatably support said element on an axis generally parallel to said major dimension within the magnetic field created by said stator in any position except in axial alignment with the magnetic poles of said stator.

10. A synchronous alternating current electric motor comprising, a stator having a coil, terminals on said coil connectible to a source of alternating current, a rotor positioned in the magnetic field generated by said stator, said rotor having integral magnetic poles with at least one pole within the magnetic field generated by said stator, and means to rotatably support said element on an axis inclined relative to said stator in any position except in axial alignment of said poles of said stator.

11. A synchronous alternating current electric motor comprising, a stator having a coil, terminals on said coil connectible to a source of alternating current, a rotor positioned in the magnetic field generated by said stator having an element with side surfaces, a major dimension and a minor dimension, said element composed of material having dissimilar magnetic poles on opposite sides spaced across the major dimension, and means to rotatably support said element on an axis generally parallel to said minor dimension in any inclined position except in axial alignment with the magnetic poles of said stator.

12. A synchronous alternatng current electric motor comprising, a stator having a coil, terminals on said coil connectible to a source of alternating current, a rotor positioned in the magnetic field generated by said stator, said rotor having magnetic poles successively positioned within the magnetic field generated by said stator, said rotor comprised of a metal ferrite material selected from the group components of barium ferrite, magnesium ferrite, and mixtures thereof, and means to rotatably support said rotor on an axis inclined relative to said stator and within the magnetic field thereof in any position except in axial alignment with the poles of said stator.

References Cited

UNITED STATES PATENTS

| | | | |
|---|---|---|---|
| 1,921,941 | 8/1933 | Roberts | 310—156 |
| 2,131,436 | 9/1938 | Howell | 310—156 |
| 2,131,523 | 9/1938 | Qunitavalle | 310—156 |
| 2,317,187 | 4/1943 | Griffiths | 310—156 |
| 2,504,681 | 4/1950 | Hall | 310—156 |

MILTON O. HIRSHFIELD, *Primary Examiner.*

L. L. SMITH, *Assistant Examiner.*